United States Patent [19]
Jobin et al.

[11] Patent Number: 5,794,897
[45] Date of Patent: Aug. 18, 1998

[54] TRANSMISSION LINE HANGER, A METHOD OF ATTACHING THE HANGER AND THE RESULTING ASSEMBLY

[75] Inventors: Michael J. Jobin, Elgin; Randall L. Grigoletti, Frankfort; James R. Gentile, Chicago; Hugh R. Nudd, Mokena, all of Ill.; John Williamson, Lowell, Ind.

[73] Assignee: Andrew Corporation, Orland Park, Ill.

[21] Appl. No.: 635,755

[22] Filed: Apr. 22, 1996

[51] Int. Cl.[6] .................................................. F16L 3/08
[52] U.S. Cl. .................... 248/74.4; 248/68.1; 248/74.1; 24/459; 403/12; 403/391
[58] Field of Search .......................... 248/68.1, 74.4, 248/74.1; 24/459, 569; 403/11, 12, 391, 397

[56] References Cited

U.S. PATENT DOCUMENTS

| | | | |
|---|---|---|---|
| 3,843,083 | 10/1974 | Angibaud | 248/74.4 X |
| 4,653,481 | 3/1987 | Howland et al. | 248/74.4 X |
| 5,205,520 | 4/1993 | Walker | 248/68.1 X |
| 5,257,768 | 11/1993 | Juenemann et al. | 248/68.1 X |
| 5,271,588 | 12/1993 | Doyle | 248/74.4 X |

*Primary Examiner*—Carl D. Friedman
*Assistant Examiner*—W. Glenn Edwards
*Attorney, Agent, or Firm*—Arnold, White & Durkee

[57] ABSTRACT

A hanger for attaching a length of a transmission line, such as, a coaxial cable or a waveguide to a supporting structure, such as, a crossbar on an antenna tower, includes two gripping elements. The elements have posts and openings to facilitate aligning of them with respect to each other. The posts and openings are arranged so that the posts in one element fit into the openings of the other element to help align the two elements when they are placed around a transmission line. Once aligned, the two elements are brought toward each other until they snap together to form a clamping structure which loosely grips the transmission line. The clamping structure can then be slid to the desired location on the transmission line. A bolt or a screw is then inserted through the aligned bolt or screw openings in the two elements and through the supporting structure. Finally, the bolt or screw is tightened to securely clamp the elements to the transmission line and to attach the resulting hanger to the supporting structure.

22 Claims, 3 Drawing Sheets

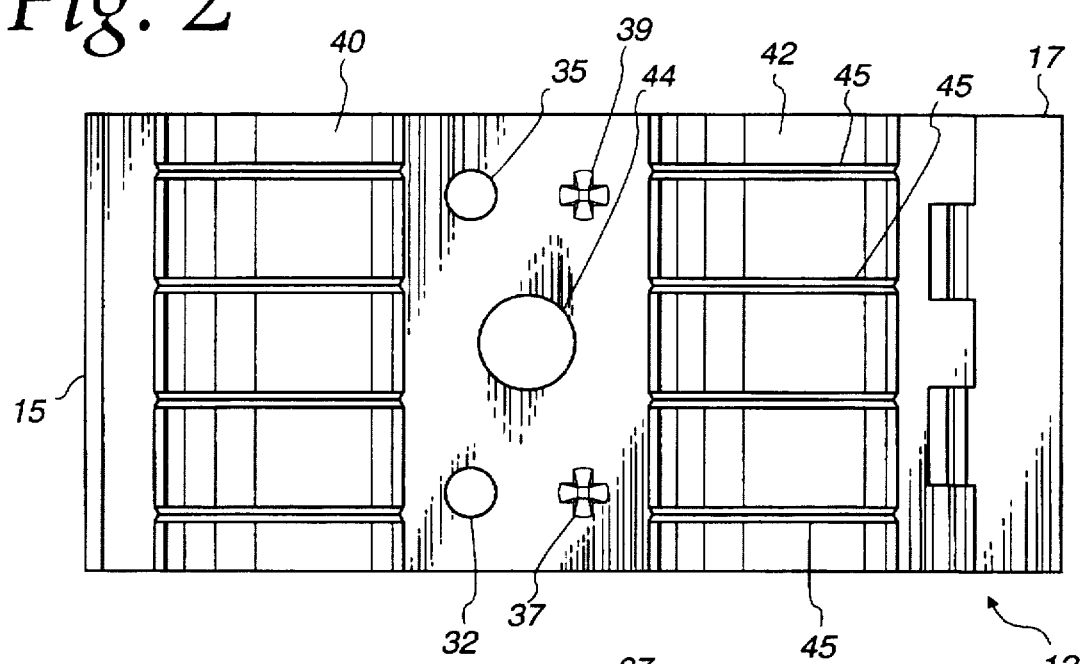
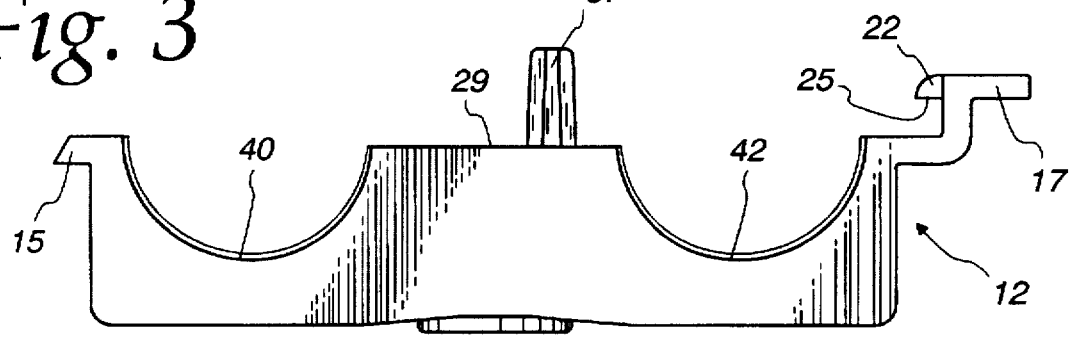
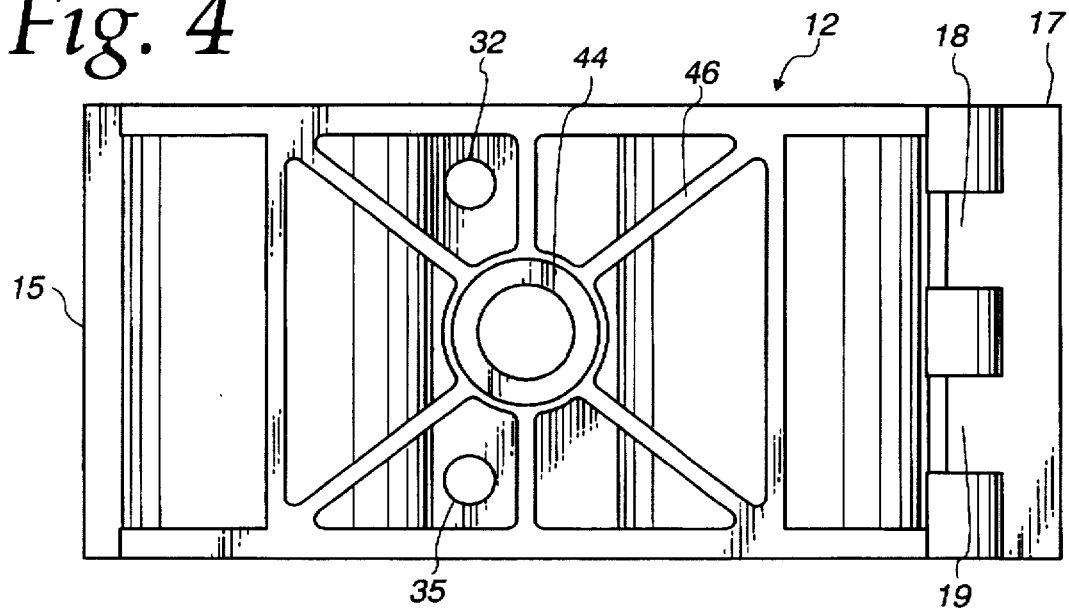

TRANSMISSION LINE HANGER, A METHOD OF ATTACHING THE HANGER AND THE RESULTING ASSEMBLY

FIELD OF THE INVENTION

This invention relates generally to hangers for supporting transmission lines, such as, coaxial cables or waveguides which are used in microwave antenna systems. It also relates to methods of installing such hangers and to the resulting assemblies.

BACKGROUND OF THE INVENTION

Hangers are used for supporting transmission lines by attaching them to supporting structures. The most extensive use of hangers is in connection with coaxial cables, such as, those disclosed in U.S. Pat. Nos. 5,334,051 (Devine et al.) and 5,167,533 (Rauwolf). Coaxial cables are extensively used for carrying a variety of signals and in most uses the cables need to be attached to the supporting structures along most of their lengths. A variety of mounting and support means for coaxial cables have been disclosed in the prior art. For example, U.S. Pat. No. 4,813,639 (Midkiffet al.) discloses a cluster mounting system for supporting coaxial cables.

Hangers are also used for supporting waveguides which carry signals from transmitting or receiving equipment in an equipment shelter to an antenna mounted on a tall tower. A large number of hangers are required to support the waveguide beneath a horizontal waveguide bridge extending between the shelter and the base of the tower and to support the waveguide on the tower as the waveguide extends upwardly to the antenna. An even larger number of hangers are those instances where separate waveguides extend to several antennas on a signal tower. Generally, commercially available waveguides have elliptical cross sections and are usually corrugated. Corrugated elliptical waveguides are disclosed, for example, in U.S. Pat. Nos. 4,540,959 (Saad) and 4,194,380 (Brown et al), 3,336,543 (Johnson et al) and 4,642,585 (Saad). However, waveguides having a variety of cross sectional shapes have been proposed. For example, a variety of waveguide shapes are disclosed in U.S. Pat. Nos. 3,822,411 (Merle) and 4,047,133 (Merle). A typical hanger for elliptical waveguide comprises a generally U-shaped clip or clamp adapted to be attached to a support member on the bridge or the tower by a bolt extending through a hole in the support member and held in place by a nut and lock washer. After the hangers have been attached to the support members, the waveguide is strung along the bridge and up the tower and is clamped between the legs of each U-shaped hanger by tightening a clamping screw which extends between the legs. A considerable amount of installation time is required, first to attach the large number of hangers to the bridge and the tower and then to clamp the waveguide within the hangers. In addition, a large number of auxiliary hardware (i.e., screws, bolts, nuts and washers) is required along with the hangers themselves.

A spring hanger system for supporting a VHF circular waveguide is disclosed in U.S. Pat. No. 4,654,612 (Smith). A variety of prior art hangers for microwave transmission lines is disclosed in Andrew Corporation Catalog #36. An improved waveguide hanger is disclosed in US Pat. No. 4,763,132 (Juds et al). The waveguide hanger disclosed in the Juds et al. patent is in the form of a resiliently yieldable and generally U-shaped clip adapted to be slipped into straddling relation with the waveguide and simultaneously assembled with the support member with a snap fit.

The installation of hangers for transmission lines, such as, coaxial cables and antenna waveguides, is often a difficult and time-consuming operation. There is therefore a continuing need for efficient inexpensive hangers and for improved methods of installing them. The present invention addresses this continuing need.

Thus, one object of the present invention is to provide transmission line hangers which are stackable and which therefore are inexpensive and which can be mass produced.

Another object of the present invention is to provide transmission line hangers which can be inexpensively stored and transported.

A further object of the present invention is to provide transmission line hangers which are made of materials which are moldable, possess the required strength and provide insulating properties that are needed for some applications.

A still further object of the present invention is to provide transmission line hangers which can be easily and efficiently installed.

Another object of the present invention is to provide hangers which support a plurality of parallel transmission lines.

Still another object of the present invention to is provide hangers which clamp the entire circumference or a large portion of the circumference of the transmission line so that the load is distributed and maximum stress exerted on the hanger structure is minimized.

A still further object of the present invention is to provide hangers which have a relatively large contact surface area for clamping the transmission cable so as to distribute the stress and minimize maximum stresses imposed on any portion of the hanger.

Still another object of the present invention to provide hangers which possess excellent hoop strength.

Yet another object of the present invention is to provide hangers which can be readily disassembled and re-used.

Other objects of the present invention will become apparent to those skilled in the art upon studying this disclosure.

SUMMARY OF THE INVENTION

A hanger kit for attaching a transmission line, such as, a coaxial cable or a waveguide, to a supporting structure includes two gripping elements. The gripping elements have posts and openings to facilitate their alignment with respect to each other when they are placed around the transmission line. Once the gripping elements are aligned with each other using mating posts and openings, they are brought toward each other until they snap together to form a clamping structure. The clamping structure initially grips loosely the circumference of the transmission line so that the clamping structure can be slid by the installer to the desired location on the transmission line. Once the clamping structure is in the desired location, securing means, such as, a bolt is inserted through the aligned openings in the two gripping elements and into in the supporting structure. As the bolt is tightened, the two gripping elements are brought toward each other until they firmly clamp the transmission line between them. Tightening of the bolt also secures the clamping structure to the supporting structure. The combined surfaces of the gripping elements, that are in contact with the transmission line, extend around the transmission line and preferably conform to the shape of the transmission line so as to provide good grip and an excellent hoop strength to the assembly. The gripping surface of each gripping element has a length preferably in excess of the largest diameter of the line to further distribute stresses and to reduce the maximum stresses on any portion of the guide.

BRIEF DESCRIPTION OF THE DRAWINGS

FIG. 2 is a side plan view of the inside of one of the gripping elements shown in FIG. 1.

FIG. 3 is a top view of the gripping element of FIG. 2.

FIG. 4 is a side view of the outside of the gripping element of FIG. 2.

DETAILED DESCRIPTION OF THE INVENTION

Figure 1:
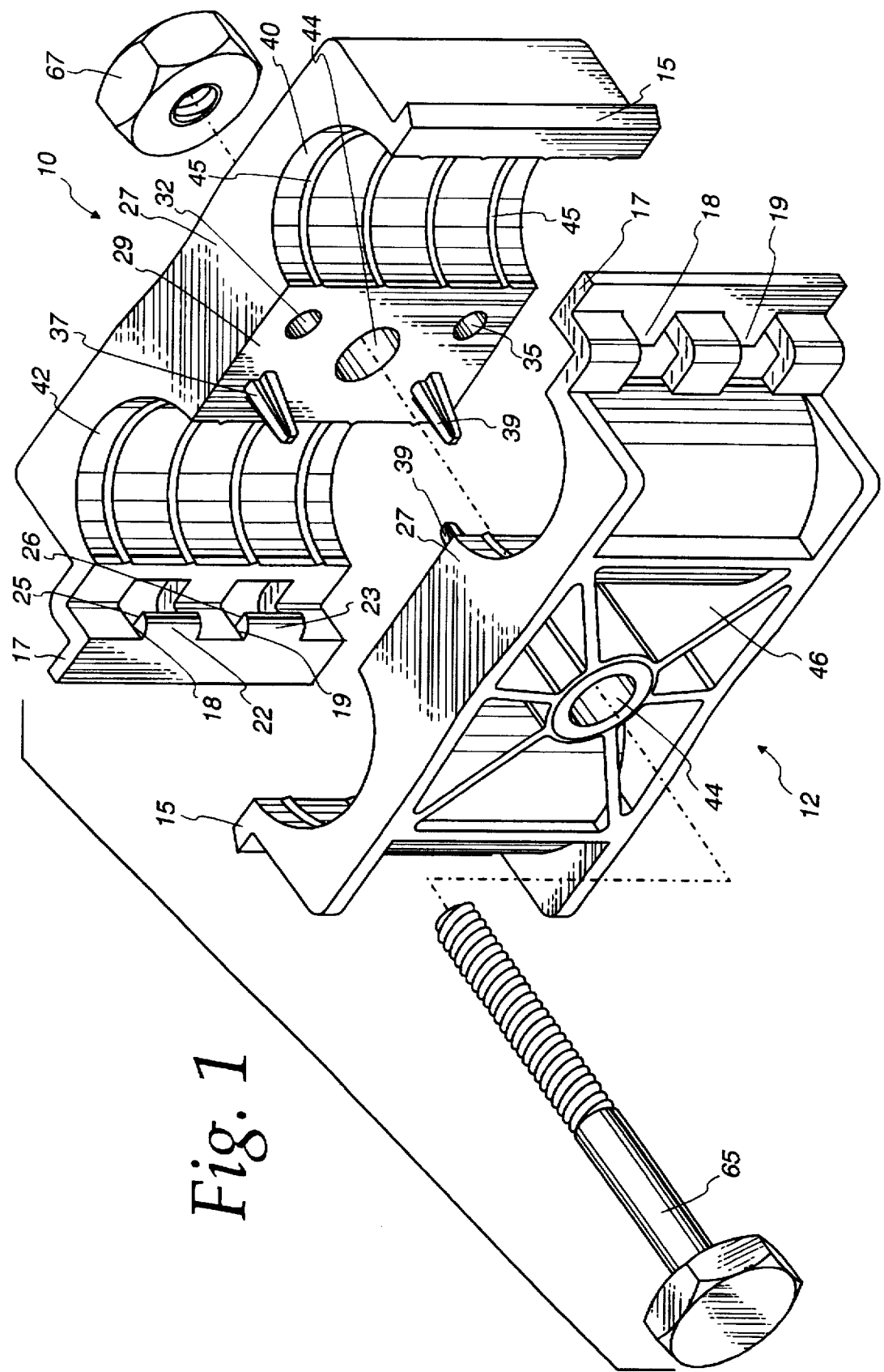
FIG. 1 is a perspective exploded view of the hanger kit constructed in accordance with the present invention, including two gripping elements constructed in accordance with the present invention.

It has been discovered that transmission lines can be efficiently and inexpensively supported by using gripping elements which snap together to form a clamping structure. The clamping structure grips loosely the transmission line so that the structure can be slid to a precise desired location on the transmission line. The snapped gripping elements are then brought further toward each other and attached to the supporting structure by securing means such as a bolt or a screw. As the bolt of the screw is tightened the gripping elements tightly clamp the outside surface of the transmission line and the clamping structure becomes attached to the supporting structure. The gripping elements preferably conform to the shape of the circumference of the transmission line so as to maximize, for a given length of the gripping element, the contact area between the transmission line and the clamping structure and to provide good hoop strength to the structure. Additionally, the gripping elements are preferably longer than the largest diameter of the cross section of the transmission line so as to further assure large contact area between the transmission line and the clamping structure. As the result of the large contact area between the clamping structure and the transmission line, when a hanger is installed, stresses are distributed and the maximum local stresses exerted on the clamping structure are minimized.

As noted above, before the clamping structure is tightened and secured to the supporting structure, the clamping structure grips loosely the transmission line. Preferably, the clamping structure grips the transmission line tightly enough to prevent the clamping structure from slipping due to its own weight when it is placed on a vertically oriented cable. However, the clamping structure should be configured to grip the transmission line loosely enough to permit the installer to slide it to the desired location on the cable without the need for use of tools.

The hangers of the present invention, may be used to support a variety of types and sizes of transmission lines including coaxial cables and waveguides, having a variety of cross sectional shapes. For the purposes of illustration, the preferred embodiment of the present invention is shown in the drawings in conjunction with the preferred use, i.e., to support a coaxial cable which has a circular cross section. The hanger of the preferred embodiment of the present invention carries two transmission lines. However, the hangers constructed in accordance with the present invention, may be adapted to secure a number of transmission lines to a supporting structure and, of course, can be adapted to secure a single transmission line. The capability of the hangers of the present invention to secure a plurality of transmission lines per hanger set, allows balanced installation and reduces hanger cost per foot of transmission line Hangers of the present invention are a relatively simple and inexpensive to manufacture, inexpensive to transport and to store. They are also easy to install. The hangers of the present invention are preferably composed of two identical and interchangeable gripping elements which possess gripping surfaces that combine to provide a complete wrap-around grip on the transmission line. Several advantages flow from the use of hangers composed of identical halves. First, such hangers are more economical to manufacture. They require a single mold. Second, they are easy to order and distribute. Finally, the installers need not be concerned about having to select the proper half for installation. Once the gripping elements are snapped together they form a clamping structure which loosely grips the outside surface of the transmission line. The clamping structure can slide up, down or along the transmission line before being secured to the support member. This approach provides an easy and efficient installation method.

The hangers of the present invention are preferably stackable across various transmission line sizes, allowing installation flexibility, ease of storage and efficient transportation.

The preferred hangers of the present invention employ gripping elements that are made from molded plastic, most preferably are made of black polypropylene, i.e., polypropylene which contains carbon black for protection of the plastic from UV light. One advantage of using a black polypropylene for making the gripping elements is its low cost and ready availability as a commodity resin. Another advantage is its strength and relatively low creep when subjected to stresses over a prolonged period of time. An alternative preferred material for manufacturing of the hangers of the present invention is a non-halogenated fire-retardant plastic. Such plastic is especially useful for indoor and tunnel applications.

The gripping elements of the hangers of the present invention are preferably made into unitary molded plastic parts by injection molding. The gripping elements are preferably relatively thin-walled structures constructed with appropriate reinforcing ribs, for an optimum combination of strength, low weight, manufacturability and low cost.

To provide for easy and efficient aligning of the two elements, each gripping element preferably has two posts and two openings. The posts of the first element fit into and align with the openings on the second element and vice versa. When the two elements are brought together, the posts enter the openings. The two gripping elements for forming a hanger snap together. The snapping arrangement is preferably provided by a flat end and an L-shaped end. The L-shaped end has a flat portion and a perpendicular portion. The perpendicular portion has lugs on its edge. The flat end of one half aligns with the L-shaped end of the other half. When the two gripping elements are brought together, the flat end snaps past the lugs and lightly butts into the flat portion of the L-shaped end. A flange on the L-shaped ends provides a surface for the user to press down upon to snap together the two elements and also facilitates disassembly.

Both gripping elements of the hanger preferably have a central bolt opening. When the two gripping elements are snapped together to form a clamping structure and slid along on the transmission line to a desired location, a bolt is inserted through the central bolt openings to secure the hanger to a supporting structure such as a cross bar.

The hanger may be installed easily and quickly. One of the hanger elements is positioned in proximity to the support member. The transmission lines are aligned along the recesses of the hanger element. The posts and openings facilitate the alignment of the second element. Once posts locate the corresponding openings, the two elements are pressed together enclosing the transmission lines between them. The posts enter the openings, and the flat ends snap past the lugs on the perpendicular portions of the L-shaped ends to lightly butt the flat portions of the L-shaped ends. The recesses of the elements wrap-around and clamp the transmission line, allowing the notches to loosely grip the outside surface of the transmission line.

The joined hanger elements may be slid along the transmission line to a desired position. The lugs prevent the two halves from separating after being snapped together. Once the hanger at its desired position, the bolt is passed through the bolt openings and secured to the support member. The bolt is tightened fixing the position of the hanger on transmission lines. The tightening of the bolt closes any gaps between the hanger halves and firmly clamps the flat ends to the flat portions of the L-shaped ends. Tightening the bolt strengthens the grip of the notches on the outer surface of the transmission line.

Once the hanger is fully installed, the notches which are preferably included on the recessed surfaces of the gripping elements firmly wrap around and grip the transmission line reducing axial cable slippage, securing the cable from vibration and minimizing material creep. The two gripping elements of the hanger clipped together at the edges with the flat and L-shaped ends provide hoop strength. The hoop strength provides extra gripping force on the transmission lines and counters any loss of gripping force over time because of creep of the plastic material.

The gripping elements are re-usable and can be readily disassembled. By pressing the L-shaped end the ends can be unsnapped from each other, separated and used in other installations.

DESCRIPTION OF THE PREFERRED EMBODIMENT

The present invention will now be described in connection with the preferred embodiment shown in the drawings. Referring now to FIG. 1, two gripping elements constructed in accordance with the present invention are designated by numerals 10 and 12, respectively. The gripping elements 10 and 12 are structurally identical. They include flat ends 15 and L-shaped lug ends 17. The lug ends 17 include two lugs 18 and 19 which have an arcuate surfaces 22 and 23 and flat surfaces 25 and 26. The gripping elements 10 and 12 also include a central portion 27 with a flat surface 29.

As shown in FIGS. 1—3, the flat surface 29 has two identical openings 32 and 35 and two posts 37 and 39. The posts 37 and 39 are generally frusto-conical. The posts 37 and 39 of the gripping element 10 are configured to fit inside the openings 32 and 35 of the gripping element 12 when the two elements are reversed, i.e., when they are positioned so that the flat surfaces 29 face each other and the end 15 of the gripping element 10 faces the end 17 of the gripping element 12 and the end 17 of the gripping element 10 faces the end 15 of the gripping element 12, as shown in FIG. 1.

On either side of the central portion 27, there are gripping surfaces 40 and 42. As can be seen in FIGS. 1 and 3, the gripping surfaces 40 and 42 have semi-circular cross-sections. The gripping surface 40 and 42 include a plurality of parallel notches 45 which facilitate gripping of surfaces that come in contact with the surfaces 40 and 42. The flat surface 29 also includes central bore 44 which, as shown in FIGS. 1 and 4, extends through the portion 27.

To minimize the weight and the material costs of the elements 10 and 12, as shown in FIGS. 1 and 4, the elements 10 and 12 are made with relatively thin walls and a plurality of ribs 46 are used to enhance the structural strength of the elements 10 and 12.

Figure 5:
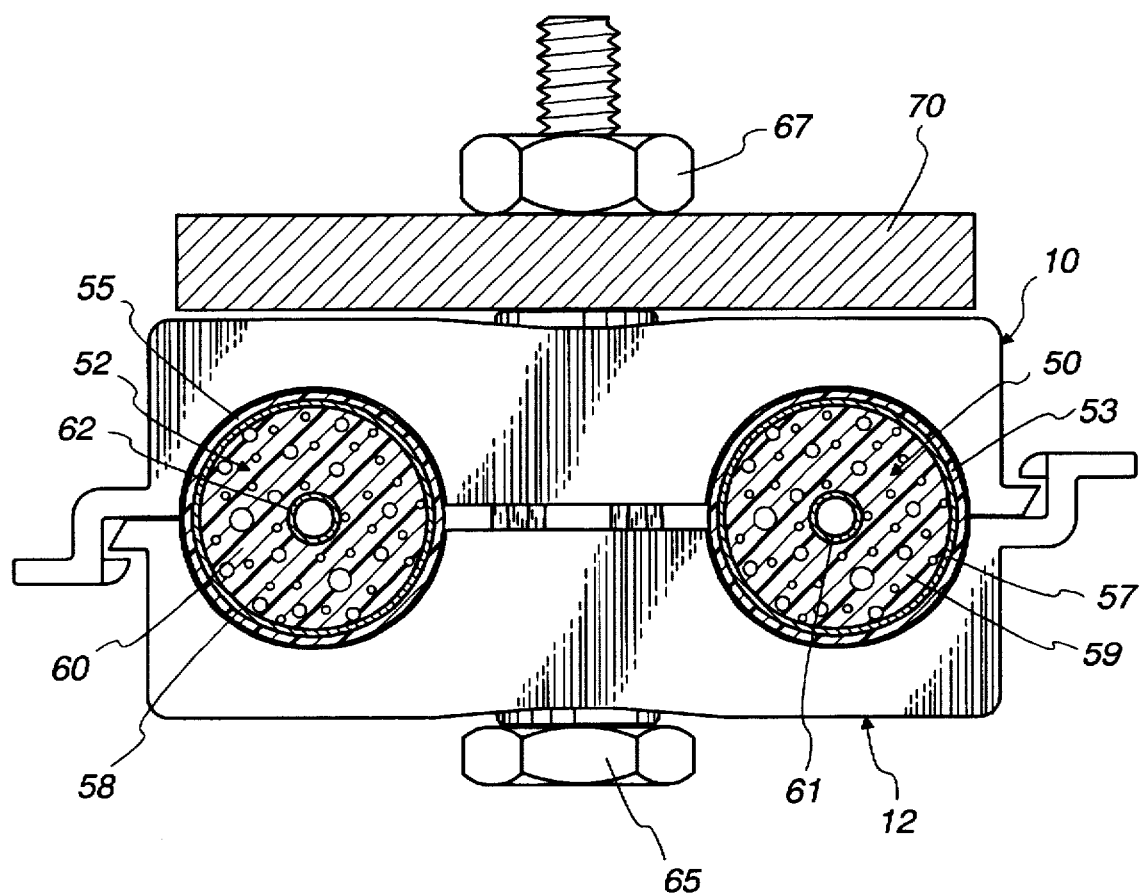
FIG. 5 is a top view, partially in cross section, of a hanger, that includes the gripping elements of FIG. 1, installed on a coaxial cable and attached to a supporting structure by a bolt.

Referring now to FIG. 5, the gripping elements 10 and 12 are shown installed around two parallel coaxial cables 50 and 52 with circular cross-sections. Each coaxial cable 50 and 52 includes an outer jacket 53 and 55, respectively. Inward of the jackets 53 and 55, the cables 50 and 52 contain outer conductors 57 and 58 (respectively), insulation 59 and 60 (respectively) and inner conductors 61 and 62. The elements 10 and 12 are secured together and to a supporting structure 70 by a bolt 65 with a nut 67.

To install a hanger in accordance with the present invention, the gripping elements 10 and 12 are positioned on opposite sides of a set of coaxial cable in a manner shown in FIG. 1 (coaxial cables not shown). The elements 10 and 12 are then brought toward each other such that the posts 37 and 39 on the element 10 fit inside the openings 32 and 35 of the element 12 and posts 37 and 39 on the element 12 fit inside the openings 32 and 35 of the element 12. As the elements are brought toward each other their ends 15 resiliently snap over the projections 22 and 23 on the ends 17 to form a clamping structure that grips loosely the outside surfaces of the coaxial cables. The clamping structure grips the coaxial cables tightly enough to prevent it from sliding down a vertical cable but loosely enough to permit the installer to slide the structure to its desired location without the need to use tools.

Once the clamping structure is located in the desired position on the coaxial cables, the bolt 65 and a nut 67 are provided as shown in FIG. 1. The bolt 65 is inserted through the central bore 44 and through an opening in the supporting structure 70, as shown in FIG. 5. A nut 67 is then threaded onto the bolt 65 until the elements 10 and 12 tightly grip the outside surfaces of the coaxial cables 50 and 52 and the clamping structure is securely attached to the supporting structure 70, as shown in FIG. 5.

The hanger of the present invention can be readily disassembled and the parts thereof can be reused in other locations. To disassemble the hanger, the securing means is first removed. Next, one of the L-shaped ends is pressed away from the mating end of the other gripping element of the clamping structure until the L-shaped end is unsnapped. The gripping elements are then separated for use in other installations.

The above description of the preferred embodiment of the present invention is for illustrative purposes only and it is not intended to limit the present invention in any manner.

Other aspects, features, advantages and modifications of the present invention will become apparent to those skilled in the art upon studying this invention. All such aspects, features, advantages and modifications of the present invention are intended to be within the scope of the present invention as defined by the claims.

What is claimed is:

1. A hanger kit for attaching at least one transmission line to a supporting structure, the transmission line having an outside surface with a first side and a second side, said first side being opposite to said second side, said hanger comprising:

a first gripping element for engaging the first side of the transmission line;

a second gripping element for engaging the second side of the transmission line;

snapping means for connecting said first gripping element to said second gripping element to form a clamping structure for loosely clamping the transmission line between said first gripping element and said second gripping element, said snapping means consisting of a first member and a second member, said first member being attached to said first gripping element, said second member being attached to said second gripping element; and means for moving said first element toward said second element of the clamping structure to tightly clamp the transmission line and for securing said clamping structure to the supporting structure.

2. The hanger kit claimed in claim 1 wherein said first element has a first recessed surface and said second element has a second recessed surface each of said first and said second recessed surface conforms to the shape of the outside surface of the transmission line.

3. The hanger kit claimed in claim 1 further comprising aligning means for aligning said first member with said second member.

4. The hanger kit claimed in claim 1 wherein each of said first recessed surface and said second recessed surface has a plurality of notches to enhance gripping of the outside surface of the transmission line.

5. The hanger kit claimed in claim 1 wherein means for moving and for securing comprises:

a first bolt opening in said first element; a second bolt opening in said second element, said first opening and said second bolt opening being aligned in the clamping structure; and, a bolt, adopted to fit in said first bolt opening and in said second bolt opening, for clamping said clamping structure and for securing said clamping structure to said supporting structure.

6. The hanger claimed in claim 1 wherein said snapping means comprises:

a flat end and an L-shaped end on said first element on and said second element; and a plurality of raised lugs on said L-shaped end, said flat end snapping past said lugs, said lugs preventing said first element and said second element from separating once snapped together.

7. The hanger claimed in claim 5 further comprising means for releasing the gripping elements from being snapped to each other so that the gripping elements can be reused.

8. The hanger kit claimed in claim 1 wherein said first element and second element are structurally identical, each of the first element and the second element having a first end and or second end, said first end being structurally different from said second end, the first end of the first element being aligned with the second end of the second element when the elements are joined to form a clamping structure.

9. The hanger kit claimed in claim 1 wherein said first element and said second element are unitary molded plastic parts.

10. The hanger kit claimed in claim 2 wherein each said first recessed surface and said second recess surface is semi-cylindrical.

11. The hanger kit claimed in claim 2 wherein each said firsts recessed surface and said second recessed surface is semi-elliptical.

12. The hanger kit claimed in claim 2 wherein said first recessed surface and said second recessed surface conform to a rectangular outer surface of the transmission line.

13. The hanger kit claimed in claim 8 wherein said first element and said second element are stackable when the first end of said first element is aligned with the first end of said second element.

14. The hanger kit claimed in claim 1 wherein aligning means comprises first post and a first post opening on the first element, a second post and a second post opening on the second element, the first post fitting inside the second post opening and the second post fitting inside the first post opening.

15. The hanger kit claimed in claim 1 wherein means for moving and securing comprises a screw.

16. The hanger kit claimed in claim 1 wherein the clamping structure is adapted to clamp a plurality of parallel transmission lines.

17. The hanger kit claimed in claim 12 wherein each of the first element and the second element has two recessed surfaces for clamping two transmission lines.

18. A method for securing a transmission line to a supporting structure, said method comprising the following steps:

placing a first element and a second element around the transmission line;

aligning said first element with said second element across the transmission line;

bringing said first element toward said second element until they are snapped together by a snapping means consisting of a first member and a second member, said first member being attached to said first element, said second member being attached to said second element so as to form a clamping structure loosely gripping the transmission line;

sliding the clamping structure to a desired location on the transmission line;

tightly clamping the clamping structure to the transmission line; and, securing the clamping structure to the supporting structure.

19. A hanger-transmission line assembly secured to a supporting structure, the assembly comprising:

a transmission line having an outside surface;

a first element in contact with the outside surface of the transmission line;

a second element in contact with the outside surface of the transmission line on the opposite side and aligned with the first element;

means for connecting said first element to said second element to form a clamping structure for loosely clamping the transmission line between said first element and said second element, said snapping means consisting of a first member and a second member, said first member being attached to said first element, said second member being attached to said second element; and means for securing the first element and the second element to the supporting structure, the transmission line being clamped between said first element and said second element.

20. A hanger kit for attaching at least one transmission line to a supporting structure, the transmission line having an outside surface with a first side and a second side, said first side being opposite to said second side, said hanger comprising:

a first gripping element for engaging the first side of the transmission line, said first gripping element having a periphery;

a second gripping element for engaging the second side of the transmission line, said second gripping element having a periphery;

snapping means for connecting said first gripping element to said second gripping element to form a clamping structure for loosely clamping the transmission line between said first gripping element and said second gripping element, said snapping means consisting of a first member and a second member, said first member being located on said periphery of said first gripping element, said second member being located on said periphery of said second gripping element; and means for moving said first element toward said second element of the clamping structure to tightly clamp the transmission line and for securing said clamping structure to the supporting structure.

21. A hanger kit for attaching at least one transmission line to a supporting structure, the transmission line having an outside surface with a first side and a second side, said first side being opposite to said second side, said hanger comprising:

a first gripping element for engaging the first side of the transmission line;

a second gripping element for engaging the second side of the transmission line;

snapping means for connecting said first gripping element to said second gripping element to form a clamping structure for loosely clamping the transmission line between said first gripping element and said second gripping element, said snapping means, all parts of said snapping means being integral with said first gripping element, and said second gripping element; and means for moving said first element toward said second element of the clamping structure to tightly clamp the transmission line and for securing said clamping structure to the supporting structure.

22. The hanger kit claimed in claim 1 wherein said first member is integral with said first gripping element, said second member is integral with said second gripping element.

* * * * *

UNITED STATES PATENT AND TRADEMARK OFFICE
CERTIFICATE OF CORRRECTION

PATENT NO. : 5,794,897
DATED : August 18, 1998
INVENTOR(S) : Jobin, et al.

It is certified that error appears in the above-identified patent and that said Letters Patent is hereby corrected as shown below:

On the title page insert the following under item [56]:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 5 | 2 | 6 | 4 | 2 | 8 | 7/2/85 | Sachs | | | |
| | | | | | | | | | | | | | |

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | WO | 95/ | 31 | 0 | 2 | 7 | A1 | 11/16/95 | France | | | | |
| | | | | | | | | | | | | | | |

Signed and Sealed this

Twenty-seventh Day of April, 1999

*Attest:*

Q. TODD DICKINSON

*Attesting Officer*  Acting Commissioner of Patents and Trademarks